Jan. 30, 1923.
A. JOHNSTON.
LAWN MOWER.
FILED FEB. 4. 1916.
1,443,540
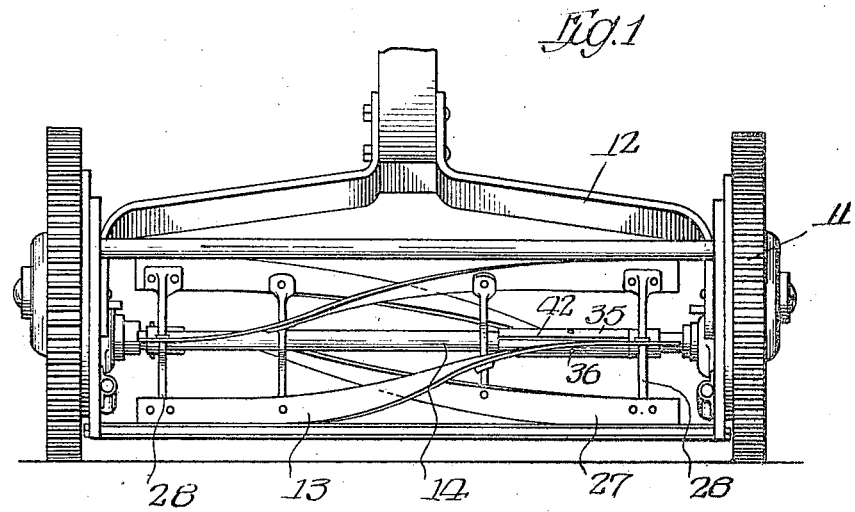
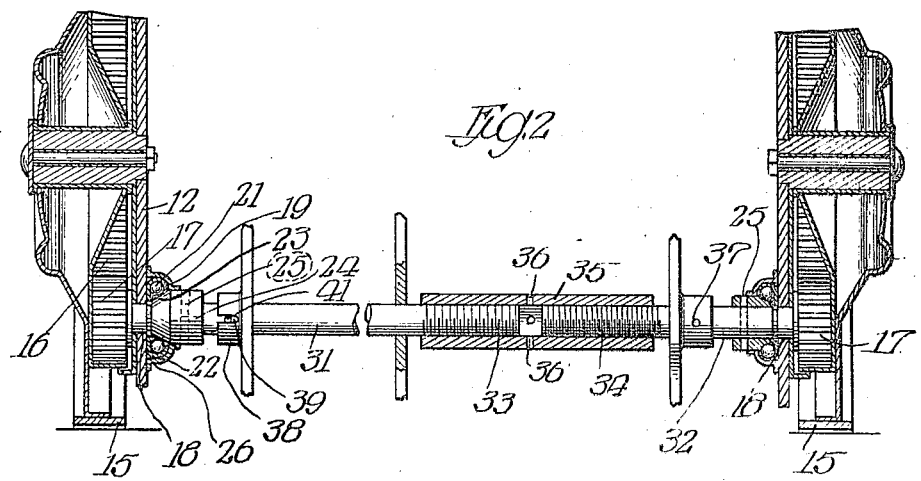
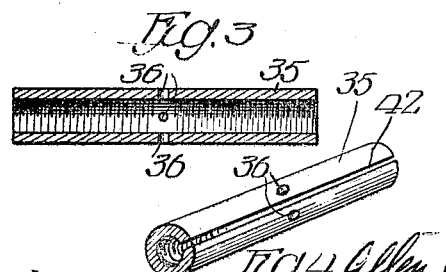
Witnesses:
Inventor
Allen Johnston Patented Jan. 30, 1923.

1,443,540

UNITED STATES PATENT OFFICE.

ALLEN JOHNSTON, OF OTTUMWA, IOWA, ASSIGNOR TO JOHNSTON PRESSED GEAR COMPANY, OF OTTUMWA, IOWA, A CORPORATION OF IOWA.

LAWN MOWER.

Application filed February 4, 1916. Serial No. 76,085.

*To all whom it may concern:*

Be it known that I, ALLEN JOHNSTON, a citizen of the United States, residing in Ottumwa, in the county of Wapello and State of Iowa, have invented a new and useful Improvement in Lawn Mowers, of which the following is a specification.

This invention relates in general to lawn mowers and has more particular reference to the reel and reel shaft of a machine of this character.

A principal object of the invention is the provision of a reel shaft and accompanying parts which may be readily adjusted as the parts wear in use, and this without interference with the strength of the parts or their driving connections in use.

A further object of the invention is the provision of such a mechanism which may be manipulated for the purposes of adjustment without requiring the use of any special instruments or tools, and also without requiring the person adjusting the machine to exercise special skill, care or knowledge.

A further object of the invention is the provision of such a mechanism which when having been once adjusted will retain the parts in fixed relationship and this without requiring the provision of any auxiliary locking members or elements, thereby enabling an adjustment to be made and maintained by merely bringing the parts into desired relation.

A still further object of the invention is the provision of a mechanism having these and other advantages which will not appreciably increase the cost of a lawn mower provided with it and which may be cheaply constructed and assembled and consisting of few and simple parts.

Other objects and advantages of the invention will be apparent as it is better understood from the following description when considered in connection with the accompanying drawing illustrating a preferred embodiment thereof.

Referring to the drawing:

Fig. 1 is a side elevation of a lawn mower in which is embodied my present invention;

Fig. 2 is an enlarged section taken transversely of a part of the mower shown in Fig. 1;

Fig. 3 is a still further enlarged sectional view of the adjusting member; and

Fig. 4 is a perspective view of the latter.

For the purpose of illustrating my invention I have shown on the drawing a lawn mower having driving wheels 11 carrying a suitable frame 12 and actuating, as will be later described, a reel 13 mounted upon a reel shaft 14. Within the treads 15 of each driving wheel 11 is positioned an internal gear 16 which meshes with a pinion 17 connected by a ratchet (not shown) with the reel shaft 14 in the usual manner. The frame 12 is provided with apertures 18 through which the ends of the shaft 14 extend. The shaft 14 turns in bearings generally designated at 19 and disposed about the apertures 18. These bearings are anti-friction and consist in the present instance of a series of balls 21, each series mounted in a race-way defined in part by a confining plate or ring 22 and in part by a frusto-conical tapered surface 23 located at or near an end of the shaft 14. The surface 23 in the present instance is provided upon a collar 24 secured by a pin 25 upon the end of the reel shaft. Suitable guards or housings 26 are provided to exclude dust from the bearings.

The reel, in accordance with the usual custom, consists of a plurality of spiral blades 27 carried upon spiders 28 which embrace the shaft at their centers. In the present instance the two end spiders have a driving engagement with the shaft, so that when the shaft rotates the reel moves with it in use. The shaft 14 in the present instance consists of two parts 31 and 32 arranged in alignment with their adjacent ends threaded at 33 and 34. These ends are connected by a yielding or spring sleeve 35 threaded internally in accordance with the threads on the adjacent ends of the shaft parts 31 and 32. The ends 33 and 34 are threaded in different fashion, in the present instance being shown with one set of the threads coarser than the other, so that turning of the sleeve 35, as will be later described, causes the shaft to lengthen and shorten in accordance with the direction of rotation of the sleeve. This rotation is given the sleeve through the insertion of any suitable nail or other thin strong instrument through apertures 36 disposed through the sleeve and located between the adjacent ends of the shaft when in any position. One part 32 of the shaft is fixedly secured in the present instance by a pin 37, with an end spider, 28 of the reel, and the other part 31 of the reel shaft has a sliding engagement with the spider. This sliding engagement in the present instance is provided by slotting on opposite sides at 39 the hub 38 of the spider and positioning a pin 41 through the shaft part with its ends extending into the slots.

The sleeve 35 is of spring steel and is slit longitudinally at 42. It is so dimensioned that when placed in the position shown it will be sprung to somewhat larger diameter, causing it to exert a strong spring pressure upon the ends of the shaft parts which are held by it. When thus constructed it maintains the parts in adjusted relationship and this without the provision of any auxiliary locking member.

Adjustment may be made by merely inserting a nail or other tool in the apertures 36 and turning the sleeves until the desired tightness is felt at the bearings. As the bearings wear from use the adjustment may be altered by a repetition of the steps. The device is simple, composed of few cheaply provided parts and can be readily manipulated by the average user without special equipment and without the aid of skill or a special knowledge of machinery.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a lawn mower the combination of a two-part reel shaft, each part carrying a conical face forming a part of an antifriction raceway, and a connection between said shaft parts comprising a sleeve adjustably engaging adjacent portions of said shaft parts to adjust the conical faces.

2. In a lawn mower, a reel shaft comprising a pair of rods placed end to end and each carrying a conical face forming a part of an antifriction raceway, and a connection between the ends of the rods for moving them axially with respect to each other to adjust said faces.

3. In a lawn mower the combination of a two-part reel shaft, each of said parts carrying a conical face forming a part of an antifriction race-way, and means connecting said parts together and adapted to move said parts to adjust said anti-friction raceways, said means comprising a spring sleeve in threaded engagement with adjacent ends of said parts.

4. In a lawn mower the combination of a two-part reel shaft, each of said parts carrying a conical face forming a part of an antifriction race-way, and means connecting said parts together and adapted to move said parts to adjust said anti-friction raceways, said means comprising a slit springy metal sleeve in threaded engagement with adjacent ends of said parts.

5. In a lawn mower, the combination of a frame, a two-part reel shaft, an antifriction bearing between each said shaft part and the frame, and a connection between said shaft parts for moving them axially with respect to each other to adjust the bearing faces of the shaft parts with respect to the bearing faces of the frame.

In testimony whereof I have hereunto set my hand and seal in the presence of two subscribing witnesses.

ALLEN JOHNSTON.

Witnesses:
SID J. PALMER,
A. H. MACDONALD.